(12) United States Patent
Pan et al.

(10) Patent No.: US 8,867,251 B2
(45) Date of Patent: Oct. 21, 2014

(54) POWER SUPPLY DEVICE FOR SOLID STATE DRIVE

(75) Inventors: Ya-Jun Pan, Shenzhen (CN); Ying-Bin Fu, Shenzhen (CN); Ting Ge, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 165 days.

(21) Appl. No.: 13/596,021

(22) Filed: Aug. 27, 2012

(65) Prior Publication Data

US 2013/0262885 A1 Oct. 3, 2013

(30) Foreign Application Priority Data

Apr. 2, 2012 (CN) .......................... 2012 2 0136916

(51) Int. Cl.
*H02M 1/00* (2006.01)
*G05F 1/00* (2006.01)

(52) U.S. Cl.
USPC .......................................... 363/147; 323/266

(58) Field of Classification Search
USPC .......................................... 363/147; 323/266
See application file for complete search history.

(56) References Cited

U.S. PATENT DOCUMENTS

| | | | | |
|---|---|---|---|---|
| 5,815,426 | A * | 9/1998 | Jigour et al. | 365/51 |
| 7,234,644 | B2 * | 6/2007 | Nishizawa et al. | 361/737 |
| 8,073,986 | B2 * | 12/2011 | Estakhri et al. | 710/11 |
| 2006/0117393 | A1 * | 6/2006 | Merry et al. | 726/34 |
| 2009/0196100 | A1 * | 8/2009 | Merry et al. | 365/185.04 |
| 2013/0119959 | A1 * | 5/2013 | Bai et al. | 323/299 |

* cited by examiner

*Primary Examiner* — Jue Zhang
(74) *Attorney, Agent, or Firm* — Novak Druce Connolly Bove + Quigg LLP

(57) ABSTRACT

A power supply device for a solid state drive (SSD) inserted into a slot of a computer includes a number of voltage input contacts, a diode, a first voltage regulating module and a second voltage regulating module connected in series. The slot includes a number of voltage output contacts and a number of signal transmitting contacts. The voltage input contacts are connected to the voltage output contacts and selectively connected to the signal transmitting contacts. The voltage input contacts obtains an initial voltage from the slot from the voltage output contacts or the signal transmitting contacts. The first voltage regulating module boosts the initial voltage. The second voltage regulating module regulates the boosted voltage to a preset voltage. The diode prevents a voltage outputting from the voltage input contacts to the signal transmitting contacts.

12 Claims, 2 Drawing Sheets

POWER SUPPLY DEVICE FOR SOLID STATE DRIVE

BACKGROUND

1. Technical Field

The disclosure generally relates to power supply devices, and particularly to a power supply device for a solid state drive (SSD).

2. Description of Related Art

An SSD is commonly installed in computers by inserting the SSD into a small outline dual in line memory module (SO-DIMM) slot defined in a main board of the computer. The SSD obtains a working voltage provided by the slot. The slot may be SO-DIMM double data rate two (DDR2) type or SO-DIMM Double Data Rate three (DDR3) type. Contact arrangements of the SO-DIMM DDR2 type and the SO-DIMM DDR3 type slot are different. If contact arrangements of the SSD do not match with contact arrangements of the slot, one or more power supply contacts of the SSD may be connected to some signal transmitting pins of the slot. For example, when the a DDR2 standard SSD inserted into the SO-DIMM DDR3 type slot, one or more power supply contacts of the SSD may be connected to signal transmitting contacts of the slot, and those signal transmitting contacts should be served as power supply contacts to provide power supply to the SSD.

However, because the power supply of the SSD may be at a high level voltage, the SSD may transmit the high level voltage to the slot which turns the voltage of the corresponding signal contact of the slot from a low level to a high level as an error signal. The computer may execute an error command for the error signal.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the disclosure.

DETAILED DESCRIPTION

Figure 1:
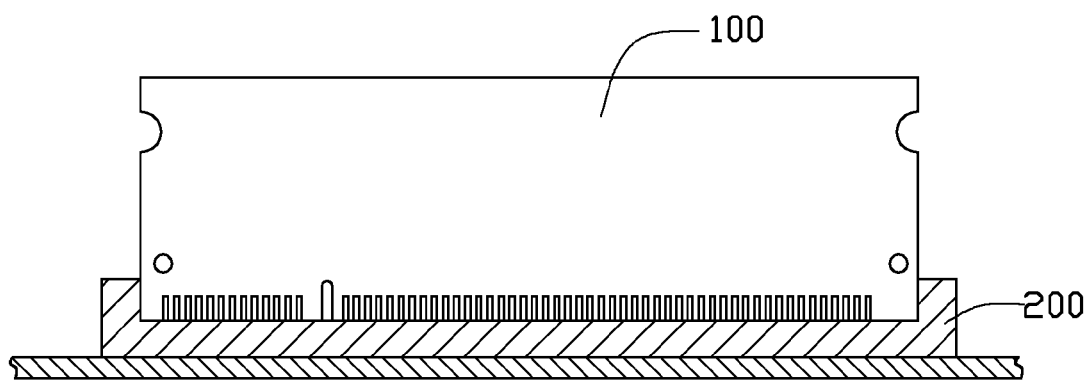
FIG. 1 is a schematic view of a SSD inserted into a slot of a main board, according to an exemplary embodiment of the disclosure.
Figure 2:
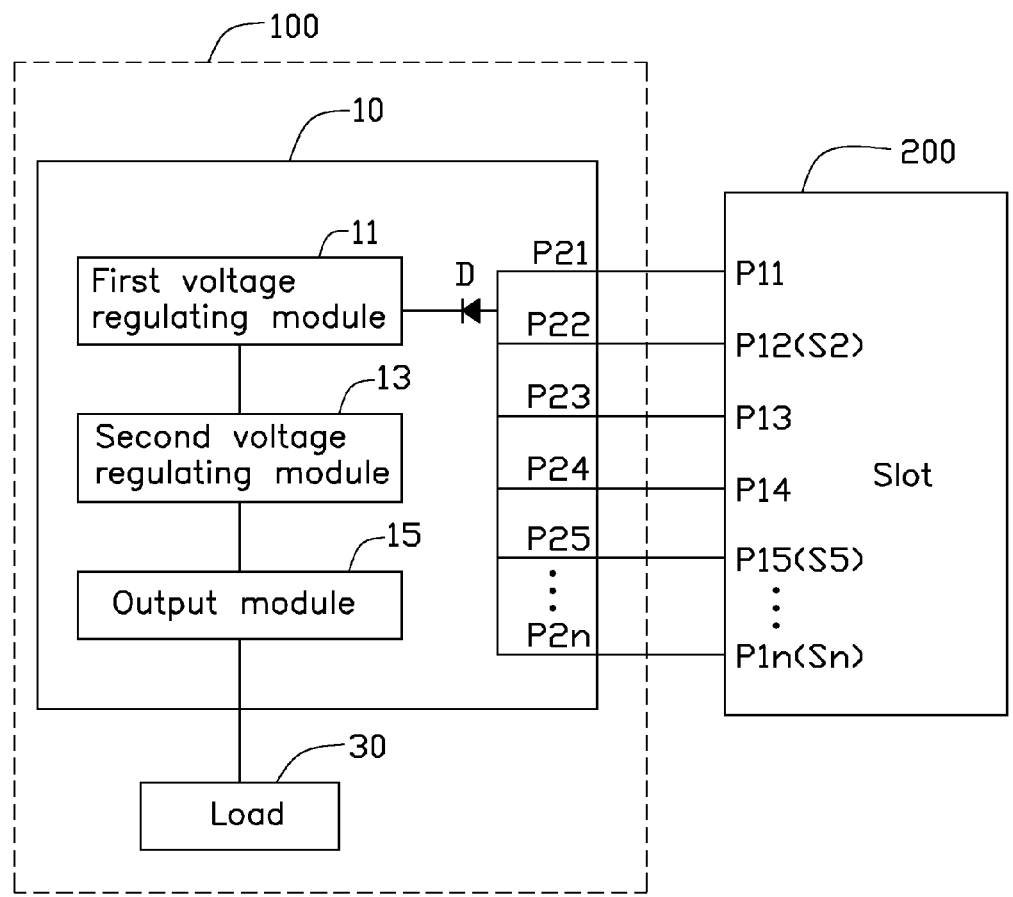
FIG. 2 is a block diagram of a power supply device for the SSD in FIG. 1, according to an exemplary embodiment of the disclosure.

Referring to FIGS. 1 and 2, a solid state drive (SSD) 100 includes a power supply device 10. The SSD 100 can be installed in a computer by inserting into a slot 200 defined in a motherboard of the computer. When the SSD 100 is inserted into the slot 200, the power supply device 10 obtains an initial voltage from the slot 200 and converts the initial voltage into a preset voltage to a load 30 of the SSD 100.

When the SSD 100 that includes DDR2 memory is inserted into the slot 200, the slot 200 outputs the initial voltage of about 1.8 V, in one example. When the SSD 100 that includes DDR3 memory is inserted into the slot 200, the slot 200 outputs the initial voltage of about 1.35 V or 1.5 V, in one example. The slot 200 includes a plurality of voltage output contacts P1n-P2n (n is defined as a natural number) and a plurality of signal transmitting contacts S1-Sn (n is defined as a natural number) respectively configured for providing the initial voltage to the SSD 100 and transmitting signals to the SSD 100.

The power supply device 10 includes a plurality of voltage input contacts P21-P2n (n is defined as a natural number), a diode D, a first voltage regulating module 11, a second voltage regulating module 13, and an output module 15 connected in series.

When the SSD 100 is inserted into the slot 200, the voltage input contacts P21-P2n are electrically connected to the voltage output contacts P11-P1n and the signal transmitting contacts S1-Sn, and the voltage input contacts obtain the initial voltage from the slot 200.

A cathode of the diode D is electrically connected to the voltage input contact P21-P2n. An Anode of the diode D is electrically connected to the first voltage regulating module 11. The initial voltage output from the slot 200 can be input into the first voltage regulating module 11 by turning on the diode D. In addition, a high level voltage (e.g. a voltage greater than 0V; i.e. logic 1) of the voltage input contact P21-P2n can be prevented from inputting into the signal transmitting contacts S1-Sn by the diode D as error signals and protect the motherboard.

The first voltage regulating module 11 may be a boost circuit. The first voltage regulating module 11 boosts the initial voltage and transmits the boosted voltage to the second voltage regulating module 13. The second voltage regulating module 13 may be a buck circuit. The second voltage regulating module 13 receives the boosted voltage and regulates the boosted voltage to a preset voltage (e.g. a rated voltage) for the load 30. The output module 15 is an input/output (I/O) interface. The output module 15 is electrically connected between the second voltage regulating module 13 and the load 30. The output module 15 transmits the preset voltage to the load 30 from the second regulating module 15.

When the SSD 100 is inserted into the slot 200, and contact arrangement of the SSD 100 matches with that of the slot 200, the voltage input contacts P21-P20 are respectively connected to the voltage output contacts P11-P1n and obtains the initial voltage from the voltage output contacts P11-P1n. The diode D is turned on so that the first voltage regulating module 11 boosts the initial voltage and transmits the boosted voltage to the second voltage regulating module 13. The second voltage regulating module 13 receives the boosted voltage and regulates the boosted voltage to the preset voltage for the load 30.

When the SSD 100 is inserted into the slot 200, and contact arrangement of the SSD 100 does not match with that of the slot 200, the voltage input contacts P21-P2n are connected to the voltage output contacts P11-P1n and the signal transmitting contacts S1-Sn. The signal transmitting contacts S1-Sn are served as power supply contacts. The voltage input contacts P21-P20 obtain the initial voltage from the voltage output contacts P11-P1n and the signal transmitting contacts S1-Sn. The diode D is turned on. The first voltage regulating module 11 boosts the initial voltage and transmits the boosted voltage to the second voltage regulating module 13. The second voltage regulating module 13 receives the boosted voltage and regulates the boosted voltage to the preset voltage for the load 30. During the process of providing the preset voltage to the load 30, although the voltage of the voltage input contacts P21-P2n may be at a high level because of boosting by the voltage regulating module 12, the high level voltage can be prevented from being inputted into the signal transmitting contacts S1-Sn by the diode D.

Therefore, when the SSD 100 applied with the power supply device 10 is inserted into different types of the slot 200, the voltage input contacts P21-P2n can obtain the voltage from the voltage output contacts P11-P1n and also can avoid causing the error signal to the signal transmitting contacts S1-Sn.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A power supply device for a solid state drive (SSD) inserted into a slot of a computer, the slot comprising a plurality of voltage output contacts and a plurality of signal transmitting contacts, the power supply device comprising:
    a plurality of voltage input contacts connected to the voltage output contacts and selectively connected to the signal transmitting contacts, the voltage input contacts obtaining an initial voltage from the slot via the voltage output contacts or the signal transmitting contacts;
    a first voltage regulating module connected to the voltage input contacts and boosting the initial voltage;
    a second voltage regulating module connected to the first voltage regulating module and regulating the boosted voltage to a preset voltage; and
    a diode, wherein a cathode of the diode is connected to the voltage input contacts, and an anode of the diode is connected to the first voltage regulating module.

2. The power supply device of claim 1, wherein when contact arrangement of the SSD matches with that of the slot, the voltage input contacts are respectively connected to the voltage output contacts.

3. The power supply device of claim 2, wherein when the contact arrangement of the SSD does not match with that of the slot, the voltage input contacts are connected to the voltage output contacts and the signal transmitting contacts.

4. The power supply device of claim 1, further comprising an input/output module connected between the second regulating module and a load of the SSD.

5. The power supply device of claim 1, wherein the first regulating module is a boost circuit.

6. The power supply device of claim 1, wherein the second regulating module is a buck circuit.

7. A solid state drive (SSD), the SSD inserted into a slot of a computer, the slot comprising a plurality of voltage output contacts and a plurality of signal transmitting contacts, the SSD comprising:
    a power supply device, comprising:
        a plurality of voltage input contacts connected to the voltage output contacts and selectively connected to the signal transmitting contacts, the voltage input contacts obtaining an initial voltage from the slot via the voltage output contacts or the signal transmitting contacts;
        a first voltage regulating module connected to the voltage input contacts and boosting the initial voltage;
        a second voltage regulating module connected to the first voltage regulating module and regulating the boosted voltage to a preset voltage; and
        a diode; wherein a cathode of the diode is connected to the voltage input contacts, an anode of the diode is connected to the first voltage regulating module; and
    a load obtaining the preset voltage from the second voltage regulating module.

8. The SSD of claim 7, wherein when contact arrangement of the SSD matches with that of the slot, the voltage input contacts are respectively connected to the voltage output contacts.

9. The SSD of claim 8, wherein when the contact arrangement of the SSD does not match with that of the slot, the voltage input contacts are connected to the voltage output contacts and the signal transmitting contacts.

10. The SSD of claim 7, further comprising an in/output module connected between the second regulating module and a load of the SSD.

11. The SSD of claim 7, wherein the first regulating module is a boost circuit.

12. The SSD of claim 7, wherein the second regulating module is a buck circuit.

* * * * *